(12) United States Patent
Geshi (10) Patent No.: US 12,443,121 B2
(45) Date of Patent: Oct. 14, 2025

(54) IMAGE FORMING APPARATUS

(71) Applicant: SHARP KABUSHIKI KAISHA, Sakai (JP)

(72) Inventor: Naruhito Geshi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/613,394

(22) Filed: Mar. 22, 2024

(65) Prior Publication Data

US 2024/0337962 A1    Oct. 10, 2024

(30) Foreign Application Priority Data

Apr. 4, 2023   (JP) ................. 2023-060692

(51) Int. Cl.
G03G 15/01    (2006.01)
G03G 15/16    (2006.01)
G03G 21/16    (2006.01)
H04N 1/00     (2006.01)

(52) U.S. Cl.
CPC ..... *G03G 15/0136* (2013.01); *G03G 15/0189* (2013.01); *G03G 15/1615* (2013.01); *G03G 21/1623* (2013.01); *H04N 1/00538* (2013.01); *H04N 1/00557* (2013.01); *H04N 1/00559* (2013.01); *G03G 2221/1684* (2013.01); *H04N 2201/0094* (2013.01)

(58) Field of Classification Search
CPC .......... G03G 15/0131; G03G 15/0136; G03G 15/0189; G03G 15/1605–162; G03G 21/1623; G03G 21/168; G03G 2221/1684; H04N 1/00538; H04N 1/00557; H04N 1/00559; H04N 2201/0094

See application file for complete search history.

(56) References Cited

U.S. PATENT DOCUMENTS

| | | | |
|---|---|---|---|
| 2009/0123178 A1* | 5/2009 | Suzuki | G03G 21/168 399/302 |
| 2013/0322934 A1* | 12/2013 | Hatano | G03G 15/1615 399/302 |
| 2015/0268591 A1* | 9/2015 | Fujita | G03G 15/1615 399/121 |
| 2019/0101856 A1* | 4/2019 | Ohkubo | G03G 15/1615 |
| 2025/0068121 A1* | 2/2025 | Tachiki | G03G 21/168 |

FOREIGN PATENT DOCUMENTS

JP         2006-235347 A     9/2006

* cited by examiner

*Primary Examiner* — Carla J Therrien
(74) *Attorney, Agent, or Firm* — ScienBiziP, P.C.

(57) ABSTRACT

An image forming apparatus includes a primary transfer unit 42 that is attachable and detachable. The primary transfer unit includes a contact and separation mechanism 62 that causes primary transfer rollers 60 to come into contact with and separate from photoreceptor drums 36. The contact and separation mechanism includes a plurality of arm members 76, a link member 78, a cam member 80, and a first grip 92. In the contact and separation mechanism, the cam member rotates by receiving a driving force from a drive source to cause the link member to reciprocate to a color position and a monochrome position, and the link member is moved to a release position by a user by using the first grip to cause all of the primary transfer rollers to separate from the photoreceptor drums.

4 Claims, 7 Drawing Sheets

IMAGE FORMING APPARATUS

BACKGROUND OF THE INVENTION

Field of the Invention

The present disclosure relates to an image forming apparatus and particularly to, for example, an image forming apparatus including a plurality of photoreceptors and a primary transfer unit disposed attachably and detachably to and from an apparatus main body.

Description of the Background Art

One example of a conventional image forming apparatus is known. In the image forming apparatus, a transfer unit (primary transfer unit) has an intermediate transfer belt (primary transfer belt) onto which toner images formed on a plurality of image carriers (photoreceptors) for each color component are sequentially transferred and a plurality of transfer rollers (primary transfer rollers) disposed to be capable of advancing and retreating between a pressing position at which the intermediate transfer belt is held in a pressed state against the image carrier and an evacuation position at which the pressed state is canceled. The transfer unit has also transfer roller urging members that urge the transfer roller toward the pressing position and a belt raising-lowering mechanism (contact and separation mechanism) that can press the transfer rollers toward the evacuation position against the urging force of the transfer roller urging members in order to raise and lower the intermediate transfer belt. Furthermore, a pressing release member is disposed on the apparatus main body side and is engaged with the belt raising-lowering mechanism to thereby release the pressing against the transfer rollers by the belt raising-lowering mechanism.

In the known technique, it is possible to raise and lower both the primary transfer rollers for color and the primary transfer roller for black by rotation of a cam member, and thus making them contact with or separate from the photoreceptor. When the primary transfer unit is detached from the apparatus main body, if a primary transfer roller remains lowered, a primary transfer belt will come into contact with the photoreceptor and cause damages. To avoid such a situation, each primary transfer roller (and hence each primary transfer belt) is kept separate from the photoreceptor. However, when all primary transfer rollers are raised and lowered by driving control of the cam member, the contact and separation mechanism becomes complicated and incurs cost.

Therefore, a main object of the present disclosure is to provide a novel image forming apparatus.

Another object of the present disclosure is to provide an image forming apparatus that can keep a primary transfer belt separate from photoreceptors when a primary transfer unit is detached from an apparatus main body while suppressing the cost.

SUMMARY OF THE INVENTION

A first aspect of the present disclosure is an image forming apparatus including a plurality of photoreceptors and a primary transfer unit disposed attachably and detachably to and from an apparatus main body. The primary transfer unit includes a primary transfer belt onto which toner images are transferred from the plurality of photoreceptors, a plurality of primary transfer rollers that include a primary transfer roller for black and a plurality of primary transfer rollers for color and are each disposed opposed to a respective one of the photoreceptors with the primary transfer belt therebetween, and a contact and separation mechanism that causes the primary transfer rollers to come into contact with and separate from the photoreceptors. The contact and separation mechanism includes a plurality of arm members that each rotatably support a respective one of the primary transfer rollers, a link member that is disposed to be capable of reciprocating in a direction orthogonal to the axial direction of the primary transfer rollers and causes the primary transfer rollers to come into contact with and separate from the photoreceptors by displacing the arm members according to a movement position, a cam member that presses and reciprocates the link member, and a grip disposed at one end part of the link member. The cam member rotates by receiving a driving force from a drive source to cause the link member to reciprocate to a color position with which all of the primary transfer rollers abut against the photoreceptors with the primary transfer belt therebetween and a monochrome position with which the primary transfer roller for black abuts against the photoreceptor with the primary transfer belt therebetween and each of the primary transfer rollers for color is separated from the photoreceptor by a first distance. A user moves the link member from the color position or the monochrome position to a release position by using the grip to cause all of the primary transfer rollers to separate from the photoreceptors.

According to the first aspect, the user manually moves the link member to the release position by using the grip and thereby all of the primary transfer rollers (and hence the whole of the primary transfer belt) separate from the photoreceptors. Therefore, with suppression of the cost, by simple configuration and operation, the primary transfer belt can be kept separate from the photoreceptors when the primary transfer unit is detached from the apparatus main body.

According to a second aspect of the present disclosure, which is dependent on the first aspect, a user moves the link member from the color position or the monochrome position to the release position by using the grip to cause each of the primary transfer rollers for color to separate from the photoreceptor by a second distance longer than the first distance.

According to a third aspect of the present disclosure, which is dependent on the first aspect, the primary transfer unit includes a lock mechanism that restricts the link member from returning from the release position to the color position or the monochrome position.

According to a fourth aspect of the present disclosure, which is dependent on the first aspect, the link member does not abut against the cam member in a state in which the link member exists at the release position.

According to a fifth aspect of the present disclosure, which is dependent on the first aspect, when the primary transfer unit is detached from the apparatus main body, the link member moves from the color position or the monochrome position to the release position by pulling the grip toward the take-out port side of the apparatus main body and the primary transfer unit is taken out from the apparatus main body by further pulling the grip after the link member has moved to the release position.

According to the present disclosure, the primary transfer belt can be kept separate from the photoreceptors when the primary transfer unit is detached from the apparatus main body at low cost, with a simple configuration, and by a simple operation.

The above-mentioned objects, other objects, features, and advantages according to the present disclosure will be made clearer from the following detailed description of an embodiment made with reference to the drawings.

DESCRIPTION OF THE PREFERRED EMBODIMENTS

Embodiment

Figure 1:
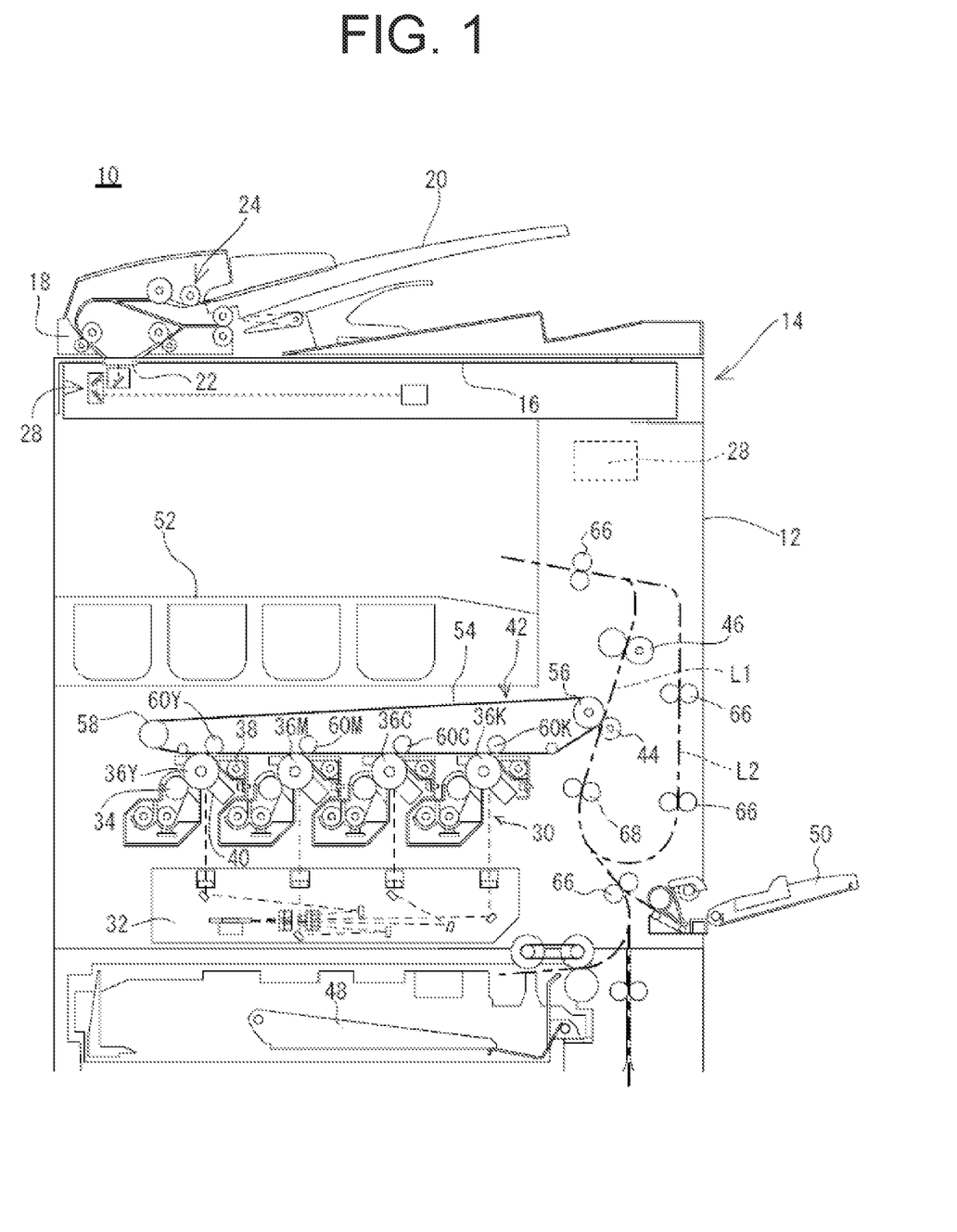
FIG. 1 is a schematic sectional view showing the internal structure of an image forming apparatus that is one embodiment of the present disclosure.

Referring to FIG. 1, an image forming apparatus 10 that is one embodiment of the present disclosure is a multifunction peripheral (MFP) having a copy function, a printer function, a scanner function, a facsimile function, etc., and forms a multicolored or monochrome image on a printing sheet by an electrophotographic method. As described in detail later, the image forming apparatus 10 is an image forming apparatus of an intermediate transfer system that executes primary transfer of toner images from a plurality of photoreceptor drums 36 (one example of the photoreceptors) juxtaposed to a primary transfer belt 54 and executes secondary transfer of the toner images from the primary transfer belt 54 to a printing sheet.

Firstly, the configuration of the image forming apparatus 10 will be schematically described. Note that, in this specification, the front-rear direction (depth direction) of the image forming apparatus 10 and its components is defined in such a manner that the surface facing the user's standing position, that is, the surface on the side on which an operation unit that is not shown in the drawings is disposed, is deemed as the front surface (front face). Note that the operation unit is disposed on the near side of the plane of paper of FIG. 1. The left-right direction (transverse direction) of the image forming apparatus 10 and its components is defined on the basis of the state when the image forming apparatus 10 is viewed from the user.

As shown in FIG. 1, the image forming apparatus 10 includes an apparatus main body 12 and an image reading device 14 disposed above the apparatus main body 12. The image reading device 14 includes a document placement table 16 made of a transparent material. A document pressing cover 18 is attached to the upper side of the document placement table 16 in a freely openable/closable manner with a hinge, or the like, therebetween. This document pressing cover 18 is provided with an auto document feeder (ADF) 24 that automatically feeds documents placed on a document placement tray 20 to an image reading position 22 one by one. Furthermore, the operation unit that accepts input operation such as a print instruction by a user is disposed on the front surface side of the document placement table 16. This operation unit is provided with a display such as a touch panel display, various operation buttons, etc., where necessary.

An image reader 26, including a light source, a plurality of mirrors, an image forming lens, a line sensor, and the like, is incorporated in the image reading device 14. The image reader 26 exposes a document surface to light from the light source, and guides reflected light from the document surface to the image forming lens by the plurality of mirrors. Then, the image forming lens forms an image from the reflected light on a light receiving element of the line sensor. The line sensor detects the luminance and the chromaticity of the reflected light that is imaged on the light receiving element, and image data based on an image on the document surface is generated. A charge coupled device (CCD), a contact image sensor (CIS), or the like, is used as the line sensor.

A controller 28 including a CPU, a memory, etc., an image former 30, and the like, are disposed in the apparatus main body 12. In response to input operation to the operation unit by the user, the controller 28 transmits a control signal to each component in the image forming apparatus 10 and causes the image forming apparatus 10 to perform various types of operation.

The image former 30 includes an exposure device 32, developing devices 34, the photoreceptor drums 36, cleaner units 38, charging devices 40, a primary transfer unit 42, a secondary transfer unit 44, a fusing unit 46, and the like, and forms an image on a printing sheet conveyed from a sheet feed cassette 48 or a manual sheet feed tray 50 and discharges the printing sheet on which the image has been formed into a sheet discharge tray 52. As the image data for forming the image on the printing sheet, image data read by the image reader 26, image data transmitted from an external computer, or the like, is used.

Here, the image data handled by the image forming apparatus 10 corresponds to a color image in four colors including black (K), cyan (C), magenta (M), and yellow (Y). Thus, four sets of the developing device 34, the photoreceptor drum 36, the cleaner unit 38, and the charging device 40 are disposed to form four kinds of latent images corresponding to the respective colors, and make up four image stations (referred to also as process units). The four image stations are disposed to line up on one row along the traveling direction (circular direction) of the surface of the primary transfer belt 54 and are disposed in order of black, cyan, magenta, and yellow from the downstream side in the traveling direction of the primary transfer belt 54, that is, from the side closer to the secondary transfer unit 44. However, the order of disposing of the respective colors can be changed as appropriate.

Note that suffixes K, C, M, and Y given to numerals indicate the corresponding colors of black, cyan, magenta, and yellow, respectively. For example, numeral 36K in FIG. 1 indicates the photoreceptor drum for black and numeral 60K indicates a primary transfer roller for black. However, in description of each component, the suffixes K, C, M, and Y are omitted and the description will be collectively made when it is not particularly necessary to distinguish which color the component is for.

The photoreceptor drums 36 are image carriers in which a photosensitive layer is formed on a surface of a cylindrical sleeve (base body) having electrical conductivity. Each of the photoreceptor drums 36 is disposed rotatably around the axis line thereof. The charging devices 40 are components that charge the surface of the photoreceptor drum 36 to a predetermined potential. The exposure device 32 is configured as a laser scanning unit (LSU) including a laser emitter, a reflection mirror, etc. and forms electrostatic latent images corresponding to the image data on the surfaces of the photoreceptor drums 36 by exposing the surfaces of the charged photoreceptor drums 36. The developing devices 34 visualize the electrostatic latent images formed on the surfaces of the photoreceptor drums 36 by toners in four colors (Y, M, C, and K). The cleaner units 38 remove a residual toner remaining on the surface of the photoreceptor drum 36 after the development and the image transfer.

The primary transfer unit 42 includes the primary transfer belt 54, a drive roller 56, a driven roller 58, four primary transfer rollers 60, a contact and separation mechanism 62, and the like, and is disposed above the photoreceptor drums 36. Note that the primary transfer unit 42, the primary transfer belt 54, and the primary transfer roller 60 are referred to also as the intermediate transfer unit, the intermediate transfer belt, and the intermediate transfer roller, respectively.

The primary transfer belt 54 is an endless strip-shaped belt stretched by a plurality of stretching rollers in such a manner as to be circularly movable in a predetermined circular direction (in FIG. 1, anticlockwise direction), and is disposed with its outer circumferential surface (lower surface) along the plurality of photoreceptor drums 36 juxtaposed. The drive roller 56, the driven roller 58, and the like, are included in the plurality of stretching rollers. Each of these stretching rollers is disposed with a shaft part extending in the front-rear direction. In image formation, the state in which the outer circumferential surface of the primary transfer belt 54 abuts against the surface of the photoreceptor drum 36 is made.

The drive roller 56 can be rotationally driven around its axis line by a drive part that is not shown in the drawings. The primary transfer belt 54 is circularly moved in the predetermined circular direction in association with this rotational driving of the drive roller 56. The driven roller 58 rotates in association with the circular movement of the primary transfer belt 54, and gives constant tension to the primary transfer belt 54 to prevent the loosening of the primary transfer belt 54.

The primary transfer roller 60 is a component for transferring (primarily transferring) a toner image formed on the corresponding photoreceptor drum 36 onto the primary transfer belt 54, and is disposed at each of positions opposed to the photoreceptor drums 36 of the respective colors with the primary transfer belt 54 therebetween. When a primary transfer current is supplied to the primary transfer roller 60, a transfer electric field is formed between the photoreceptor drum 36 and the primary transfer belt 54 at a primary transfer position. By the action of the transfer electric field formed at this primary transfer position, the toner image formed on the photoreceptor drum 36 is transferred onto the outer circumferential surface of the primary transfer belt 54.

Each of the primary transfer rollers 60 is allowed to be displaced in such a direction as to come into contact with or separate from the corresponding photoreceptor drum 36 (vertical direction) by the contact and separation mechanism 62. Furthermore, the contact and separation of the primary transfer belt 54 with and from the photoreceptor drum 36 is executed through the displacement of the primary transfer roller 60. The specific configuration of the contact and separation mechanism 62 will be described later.

The secondary transfer unit 44 includes a secondary transfer roller for transferring the toner image formed on the primary transfer belt 54 onto a printing medium, and is disposed opposed to the drive roller 56 with the primary transfer belt 54 therebetween. A printing sheet passes through a secondary transfer nip part between this secondary transfer roller and the primary transfer belt 54 and thereby the toner image formed on the primary transfer belt 54 is transferred onto the printing sheet.

The fusing unit 46 includes a heat roller and a pressure roller and is disposed over the secondary transfer unit 44. The heat roller is set to a predetermined fusing temperature. When the printing sheet passes through a nip region (fusing nip part) between the heat roller and the pressure roller, the toner image transferred onto the printing sheet is heated and pressed, and the toner image is thermally fixed onto the printing sheet.

In the apparatus main body 12, a first sheet conveyance path L1 is formed to send a printing sheet from the sheet feed cassette 48 or the manual sheet feed tray 50 to the sheet discharge tray 52 via a resist roller 68, the secondary transfer unit 44 (secondary transfer nip part), and the fusing unit 46. Furthermore, a second sheet conveyance path L2 is formed to return the printing sheet that has passed through the fusing unit 46 after printing on the surface side to the first sheet conveyance path L1 on the upstream side of the secondary transfer unit 44 in the sheet conveyance direction when double-sided printing is performed on the printing sheet. These first sheet conveyance path L1 and second sheet conveyance path L2 are appropriately provided with a plurality of conveyance rollers 66 for applying an auxiliary propulsion force to the printing sheet.

Next, the configuration of the contact and separation mechanism 62 included in the primary transfer unit 42 will be specifically described.

Note that, in FIGS. 2 to 6, the primary transfer belt 54 is omitted to facilitate understanding of the structure of the primary transfer unit 42. Moreover, in FIGS. 3 to 6, part of a front frame 70 is omitted to facilitate understanding of the operation of the contact and separation mechanism 62.

Figure 2:
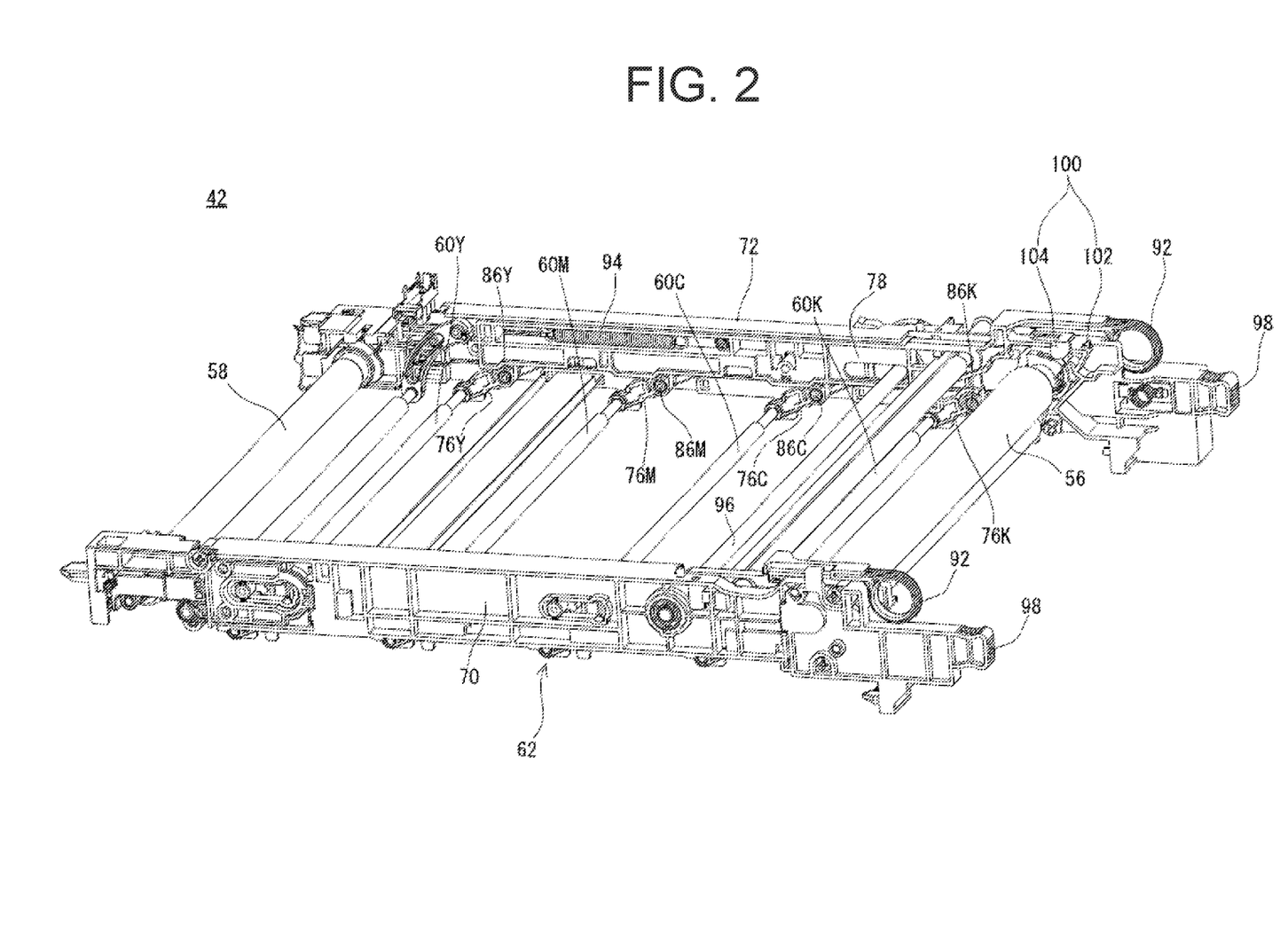
FIG. 2 is a perspective view showing a primary transfer unit in the state in which a primary transfer belt is omitted.
Figure 3:
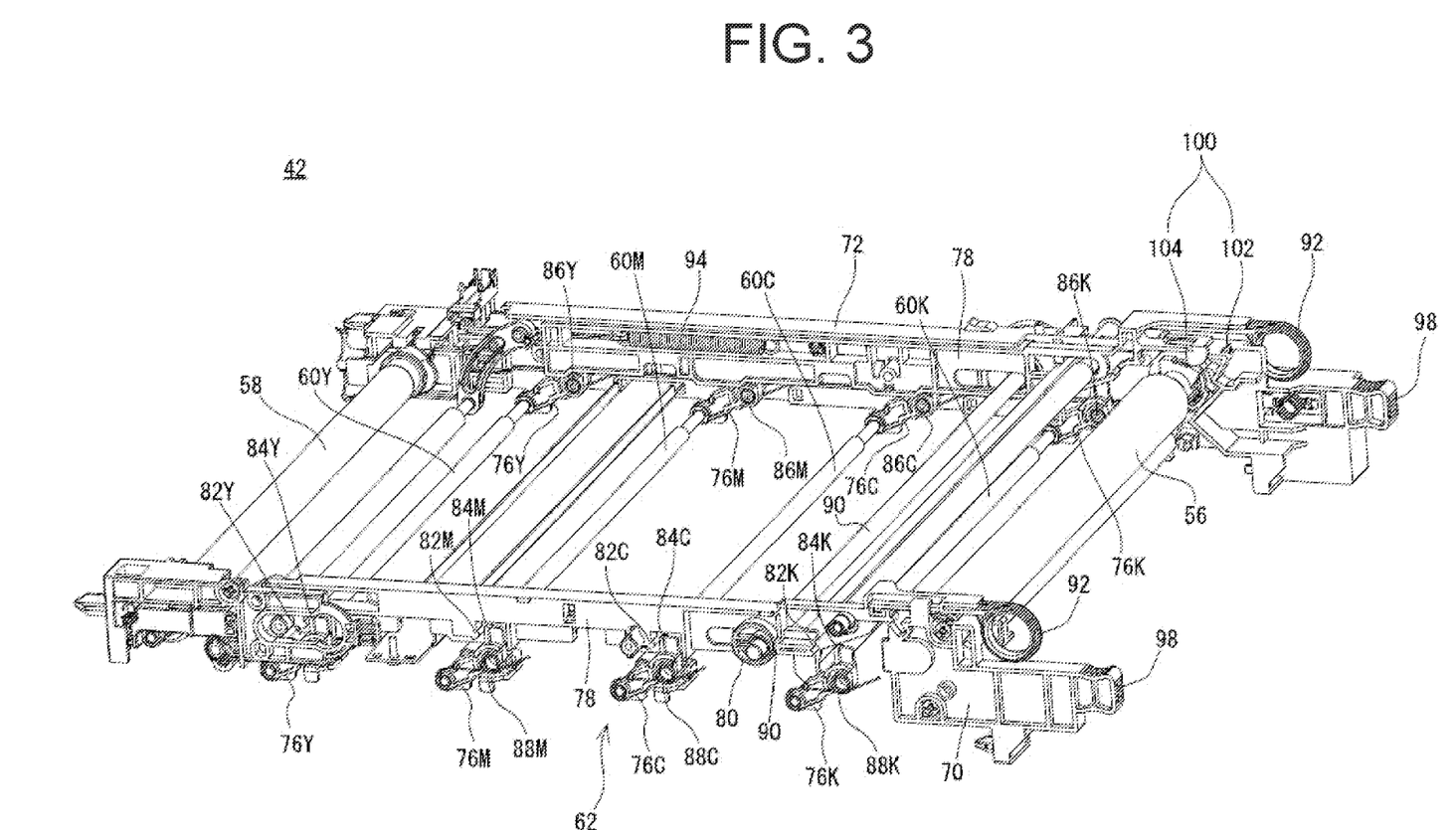
FIG. 3 is a perspective view showing the primary transfer unit in the state in which the primary transfer belt and part of a front frame are omitted.

As shown in FIGS. 2 and 3, the primary transfer unit 42 includes the primary transfer belt 54, the drive roller 56, the driven roller 58, the four primary transfer rollers 60, the contact and separation mechanism 62, and the like. These components are directly or indirectly held in a predetermined arrangement state by the front frame 70 and a rear frame 72 (hereinafter, often collectively referred to as the "unit frames 70 and 72") having a substantially rectangular plate shape extending in the left-right direction (direction orthogonal to the axial direction of the stretching rollers such as the drive roller 56).

The primary transfer unit 42 is disposed attachably and detachably to and from the apparatus main body 12. Although illustration is omitted, in this embodiment, when a right door disposed in the right side surface of the apparatus main body 12 is opened, a take-out port is opened and first grips 92 and second grips 98 disposed at a right end part of the primary transfer unit 42 are exposed to the outside. The primary transfer unit 42 can be detached from the apparatus main body 12 by gripping the first grips 92 and pulling the primary transfer unit 42 toward the take-out port side (right side). That is, the primary transfer unit 42 is laterally pulled out in the right direction from the take-out port of the apparatus main body 12. On the other hand, when the primary transfer unit 42 is attached to the apparatus main body 12, after a left part of the primary transfer unit 42 is fitted into the apparatus main body 12, the primary transfer unit 42 can be pushed toward the left to the mounting position by gripping the second grips 98.

The contact and separation mechanism 62 is a mechanism for causing the primary transfer roller 60 (and hence the primary transfer belt 54) to come into contact with and separate from the photoreceptor drum 36. The contact and separation of the primary transfer belt 54 with and from the photoreceptor drum 36 is executed through displacement of the primary transfer roller 60 to a pressing position at which the primary transfer roller 60 presses the inner circumferential surface of the primary transfer belt 54 to cause the photoreceptor drum 36 and the primary transfer belt 54 to abut against each other and a separation position at which the primary transfer roller 60 releases the pressing against the primary transfer belt 54 to separate the primary transfer belt 54 and the photoreceptor drum 36 from each other. That is, each of the primary transfer rollers 60 can be displaced to the pressing position at which the primary transfer roller 60 abuts against the photoreceptor drum 36 with the primary transfer belt 54 therebetween and the separation position at which the primary transfer roller 60 is separate from the photoreceptor drum 36. In this embodiment, the primary transfer rollers 60Y, 60M, and 60C for color are integrally displaced in conjunction with each other, and the primary transfer roller 60K for black can be displaced independently of the primary transfer rollers 60Y, 60M, and 60C for color.

For example, in a color printing mode (see FIG. 4) for forming a color image, all of the primary transfer rollers 60 are disposed at the pressing position, and all of the photoreceptor drums 36 are caused to abut against the primary transfer belt 54. Then, the toner images of the respective colors formed on the respective photoreceptor drums 36 are sequentially transferred onto the primary transfer belt 54 in a superimposed manner. This forms a multicolored toner image on the outer circumferential surface of the primary transfer belt 54. Furthermore, in a monochrome printing mode (see FIG. 5) for forming a monochrome image, the primary transfer rollers 60Y, 60M, and 60C for color are disposed at the separation position, whereas the primary transfer roller 60K for black is disposed at the pressing position and only the photoreceptor drum 36K for black is caused to abut against the primary transfer belt 54. Then, a toner image is formed only on the photoreceptor drum 36K for black, and only the black toner image is transferred onto the outer circumferential surface of the primary transfer belt 54. Moreover, at the time of attachment or detachment of the primary transfer unit 42 to or from the apparatus main body 12 (see FIG. 6), all of the primary transfer rollers 60 are disposed at the separation position, and all of the photoreceptor drums 36 are separated from the primary transfer belt 54. Note that, in this embodiment, in a standby mode (when no image is formed), the primary transfer roller 60K for black remains disposed at the pressing position.

Figure 4:
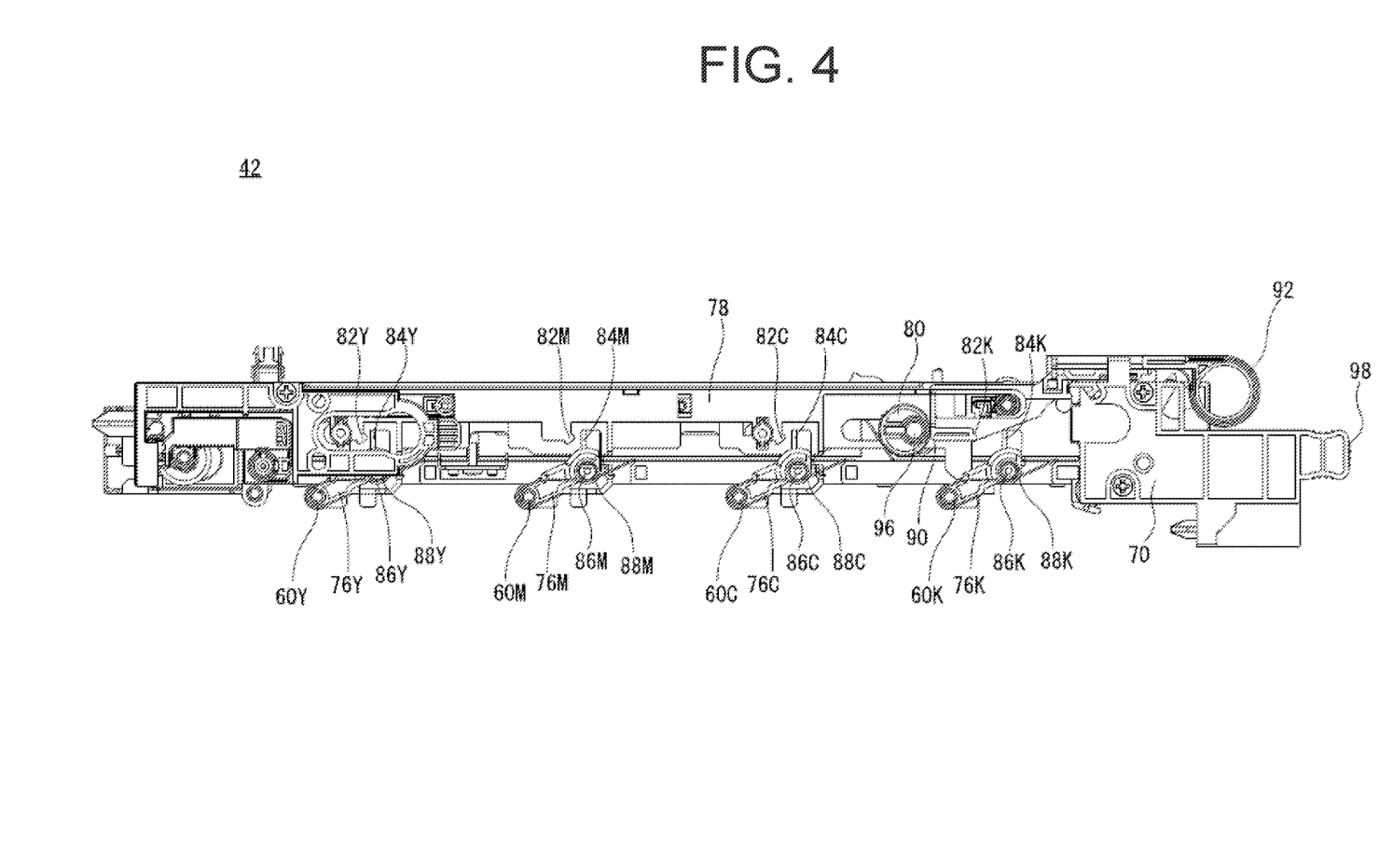
FIG. 4 is a diagram for explaining a contact and separation mechanism of primary transfer rollers and is a front view showing the primary transfer unit in a color printing mode.

Specifically, referring to FIG. 4 together with FIGS. 2 and 3, the contact and separation mechanism 62 includes four arm members 76, a link member 78, a cam member 80, and the like. Each of the four arm members 76, the link member 78, and the cam member 80 is a pair of components disposed on each of the side of the front frame 70 and the side of the rear frame 72. The four arm members 76 include arm members 76Y, 76M, and 76C for color and an arm member 76K for black.

The arm member 76 is formed into a substantially L-shape, and the primary transfer roller 60 is rotatably supported by one end part of the arm member 76. That is, the arm member 76 functions as a bearing that rotatably supports the primary transfer roller 60. On the other hand, a pressing receiver 84 that receives a pressing force from a pressing part 82 formed in the link member 78 is formed at the other end part of the arm member 76. A bent part of the arm member 76 is pivotally supported by a support protrusion 86 formed on the unit frame 70 or 72. That is, the arm member 76 can pivot with the bent part being a fulcrum, and the primary transfer roller 60 moves in the vertical direction (comes into contact with or separates from the photoreceptor drum 36) through the pivot (displacement) of the arm member 76.

A first urging member 88 such as a torsion spring that urges the arm member 76 is disposed on the support protrusion 86 that supports the arm member 76. This first urging member 88 urges the arm member 76 in such a direction as to cause the primary transfer roller 60 to move downward, that is, toward the photoreceptor drum 36 (in FIG. 4, anticlockwise direction).

The link members 78 are formed into a substantially rectangular plate shape extending in the left-right direction, and are disposed on the inner surface side of the unit frames 70 and 72 (the rear surface side of the front frame 70 and the front surface side of the rear frame 72) in such a manner as to be capable of reciprocating in the longitudinal direction thereof (left-right direction). That is, the movement direction of the link members 78 and the attachment-detachment direction of the primary transfer unit 42 are the same direction. In this link member 78, the pressing part 82 for pressing and displacing the arm member 76 is formed at each of positions on the left side of the pressing receiver 84 of the arm member 76. Furthermore, in the link member 78, a wall part 90 that receives a pressing force from the cam member 80 to be described later is formed at a position on the right side of the cam member 80.

At a right end part (one end part) of the link member 78, the first grip 92 used when a user detaches the primary transfer unit 42 from the apparatus main body 12 is disposed. The shape of the first grip 92 is not particularly limited. In this embodiment, the first grip 92 is formed into a ring shape so that the user can easily hook a finger therein. At a left end part (the other end part) of the link member 78, a second urging member 94 such as a helical extension spring that urges the link member 78 is disposed. One end of the second urging member 94 is fixed to the unit frame 70 or 72 and the other end of the second urging member 94 is fixed to the link member 78. The link member 78 is urged leftward (toward color position to be described later) by this second urging member 94.

As described in detail later, such a link member 78 causes the primary transfer roller 60 to come into contact with and separate from the photoreceptor drum 36 by displacing the arm member 76 according to the movement position. The link member 78 of this embodiment can reciprocate to three positions, i.e., the color position (see FIG. 4), a monochrome position (see FIG. 5), and a release position (free position; see FIG. 6), in that order from the movement position on the left side.

The cam members 80 are components for pressing and reciprocating the link member 78 and are attached to both end parts of a cam shaft 96 rotatably held by the unit frames 70 and 72. A drive motor that is not shown in the drawings is coupled to the cam shaft 96, and the cam members 80 rotate through the rotation of the cam shaft 96 by a driving force of the drive motor. The drive motor is a general-purpose motor such as a stepping motor and is controlled by the controller 28. The cam member 80 is, for example, a plate cam and the distance between the outer circumferential surface thereof and the cam shaft 96 changes depending on the phase (rotation angle) of the cam member 80. As described in detail later, the cam member 80 of this embodiment reciprocates the link member 78 to the color position and the monochrome position on the basis of an instruction from the controller 28.

At right end parts (one end parts) of the unit frames 70 and 72, the second grips 98 used when a user attaches the primary transfer unit 42 to the apparatus main body 12 are disposed.

In the primary transfer unit 42 including such a contact and separation mechanism 62, as described above, the positions of the primary transfer rollers 60 are moved according to three situations, i.e., in the color printing mode, in the monochrome printing mode, and in attachment or detachment. This displacement of the primary transfer rollers 60 is executed through the movement of the link members 78 to each of the color position, the monochrome position, and the release position. Specifically, in the state in which the link members 78 exist at the color position, all of the primary transfer rollers 60 abut against the photoreceptor drums 36 with the primary transfer belt 54 therebetween. In the state in which the link members 78 exist at the monochrome position, the primary transfer roller 60K for black abuts against the photoreceptor drum 36K for black with the primary transfer belt 54 therebetween, and the primary transfer rollers 60Y, 60M, and 60C for color are separated from the photoreceptor drums 36Y, 36M, and 36C for color, respectively. In the state in which the link members 78 exist at the release position, all of the primary transfer rollers 60 are separated from the photoreceptor drums 36.

In this embodiment, the cam members 80 receiving a driving force from a drive source rotate in response to an instruction from the controller 28. This causes the link members 78 (and hence the primary transfer rollers 60) to be reciprocated to the color position and the monochrome position. On the other hand, the movement of the link members 78 from the color position or the monochrome position to the release position is executed by manual operation by the user using the first grips 92. As above, the primary transfer roller 60K for black is displaced not by the driving control but by manual operation by the user. This can simplify the contact and separation mechanism 62 and reduce the cost. The operation of the contact and separation mechanism 62 will be specifically described below.

As shown in FIG. 4, in the color printing mode, the cam member 80 is appropriately rotated in accordance with an instruction from the controller 28 and is held at a phase with which the distance between the outer circumferential surface of the cam member 80 and the cam shaft 96 becomes the shortest. Furthermore, the link member 78 is held at the color position, which is the leftmost position, by the urging force of the second urging member 94. In the state in which the link member 78 exists at the color position, each pressing part 82 of the link member 78 is separated from the pressing receiver 84 of a respective one of the arm members 76, and each arm member 76 keeps the state in which a respective one of the primary transfer rollers 60 exists at the pressing position by the urging force of the first urging member 88.

Figure 5:
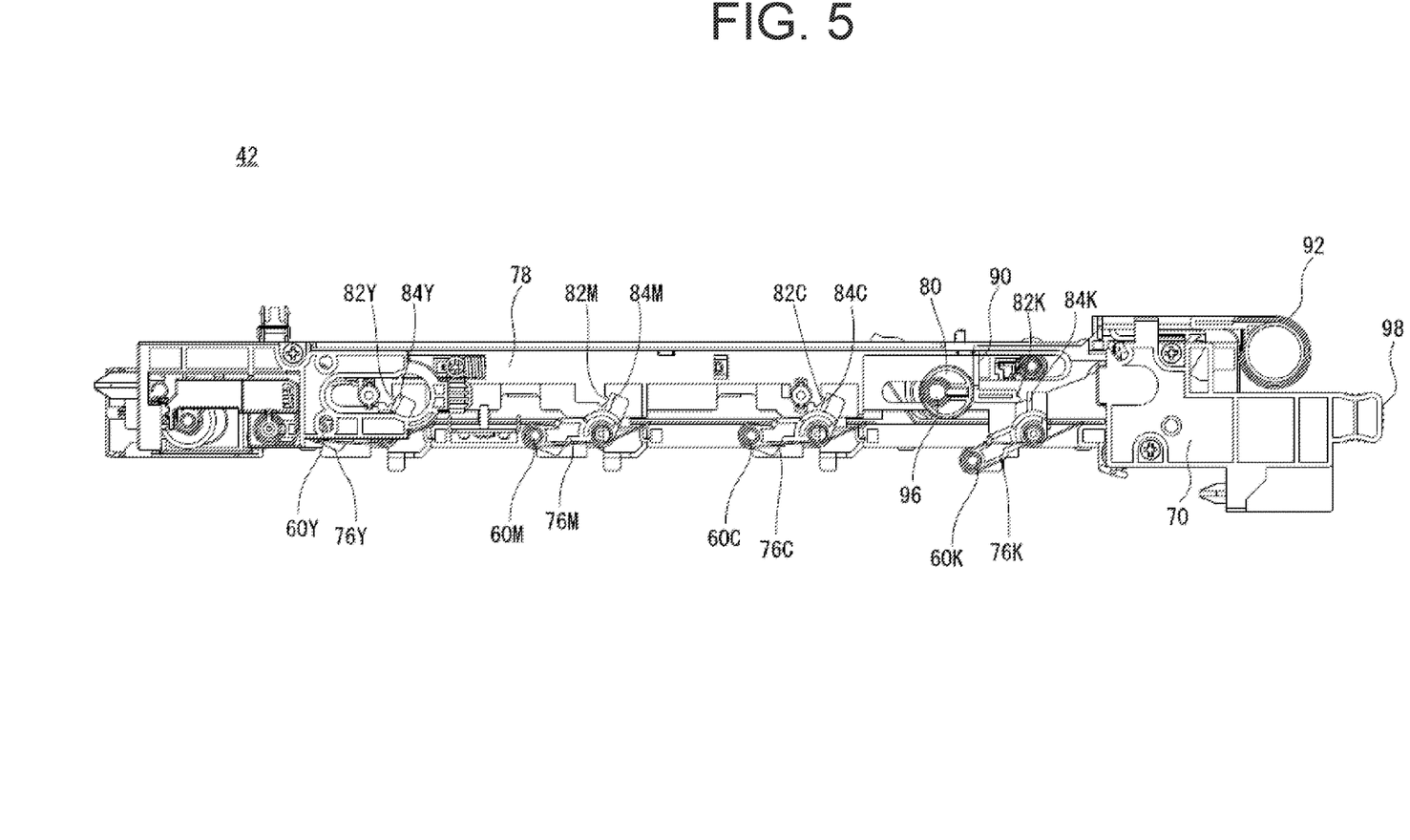
FIG. 5 is a diagram for explaining the contact and separation mechanism of the primary transfer rollers and is a front view showing the primary transfer unit in a monochrome printing mode.

As shown in FIG. 5, in the monochrome printing mode, the cam member 80 is appropriately rotated in accordance with an instruction from the controller 28 and is held at a phase with which the distance between the outer circumferential surface of the cam member 80 and the cam shaft 96 becomes the longest. The link member 78 moves to the monochrome position against the urging force of the second urging member 94 due to pushing of the wall part 90 toward the right by the cam member 80. In the state in which the link member 78 exists at the monochrome position, the pressing part 82K for black in the link member 78 is separated from the pressing receiver 84K for black in the arm member 76K for black, and the arm member 76K for black keeps the state in which the primary transfer roller 60K for black is disposed at the pressing position. On the other hand, the pressing parts 82Y, 82M, and 82C for color in the link member 78 press the pressing receivers 84Y, 84M, and 84C of the arm members 76Y, 76M, and 76C for color toward the right. This causes the arm members 76Y, 76M, and 76C for color to rotate in such a direction as to raise the primary transfer rollers 60Y, 60M, and 60C for color (in FIG. 5, clockwise direction). Thus, each of the primary transfer rollers 60Y, 60M, and 60C for color separates from the corresponding photoreceptor drum 36Y, 36M, or 36C for color.

At this time, the distance across which the primary transfer rollers 60Y, 60M, and 60C for color are separated from the photoreceptor drums 36Y, 36M, and 36C for color is set to the necessary minimum distance (first distance) to separate the primary transfer belt 54 from the photoreceptor drums 36Y, 36M, and 36C for color. This is because the following problem occurs if the separation distance between the primary transfer rollers 60Y, 60M, and 60C for color and the corresponding photoreceptor drums 36Y, 36M, and 36C for color is set long. Specifically, when the primary transfer rollers 60Y, 60M, and 60C for color are displaced to the pressing position again (when the mode is changed from the monochrome printing mode to the color printing mode), there is a possibility that a large sound is made due to shock when they are displaced at high speed, whereas a long time is required when they are displaced at low speed.

Figure 6:
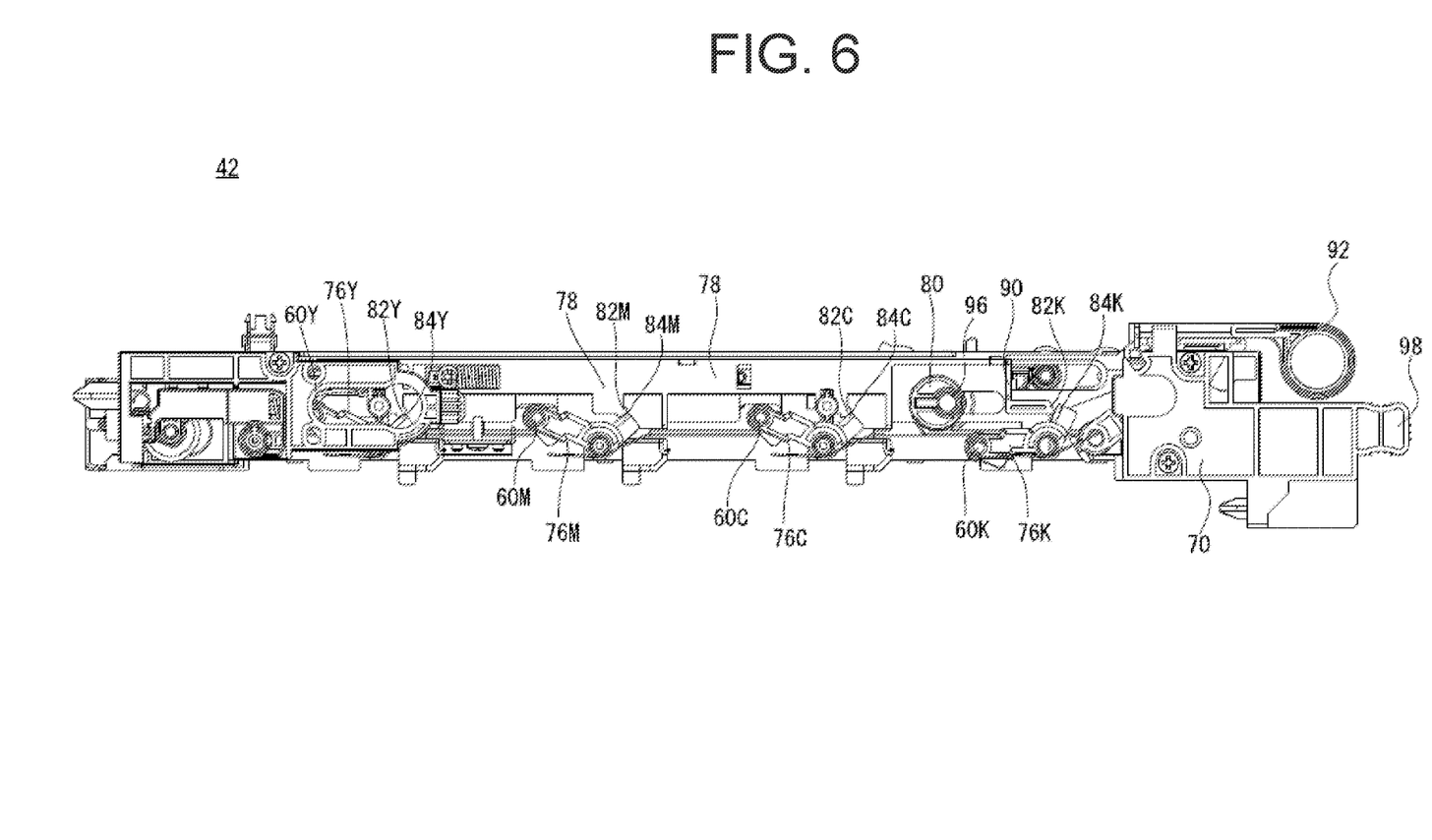
FIG. 6 is a diagram for explaining the contact and separation mechanism of the primary transfer rollers and is a front view showing the primary transfer unit at the time of attachment or detachment.

As shown in FIG. 6, when the primary transfer unit 42 is detached from the apparatus main body 12, the user pulls the first grip 92 toward the take-out port side of the apparatus main body 12 (right side). This causes the link member 78 to move from the color position or the monochrome position to the release position. In the state in which the link member 78 exists at the release position, the pressing part 82K for black in the link member 78 presses the pressing receiver 84K of the arm member 76K for black toward the right. This causes the arm member 76K for black to rotate in such a direction as to raise the primary transfer roller 60K for black (in FIG. 6, clockwise direction). Thus, the primary transfer roller 60K for black separates from the photoreceptor drum 36K for black.

Moreover, when the link member 78 moves from the color position or the monochrome position to the release position, the pressing parts 82Y, 82M, and 82C for color in the link member 78 press the pressing receivers 84Y, 84M, and 84C of the arm members 76Y, 76M, and 76C for color toward the further right side. This causes the primary transfer rollers 60Y, 60M, and 60C for color to be displaced further upward. In addition, the separation distance between the primary transfer roller 60Y, 60M, or 60C for color and the corresponding photoreceptor drum 36Y, 36M, or 36C for color becomes a second distance longer than the first distance. This allows the primary transfer belt 54 to be evacuated from the photoreceptor drums 36 to a large extent. Therefore, it is possible to more surely prevent the primary transfer belt 54 from interfering with the photoreceptor drum 36 or the like, and being damaged when the primary transfer unit 42 is detached from the apparatus main body 12.

By further pulling the first grip 92 after the link member 78 has moved to the release position, the primary transfer unit 42 is detached from the apparatus main body 12. That is, in this embodiment, in conjunction with the manual operation of detaching the primary transfer unit 42 by using the first grip 92, the primary transfer roller 60K for black separates from the photoreceptor drum 36K for black. In addition, the primary transfer rollers 60Y, 60M, and 60C for color separate from the corresponding photoreceptor drums 36Y, 36M, and 36C for color by the second distance longer than the first distance.

Figure 7:
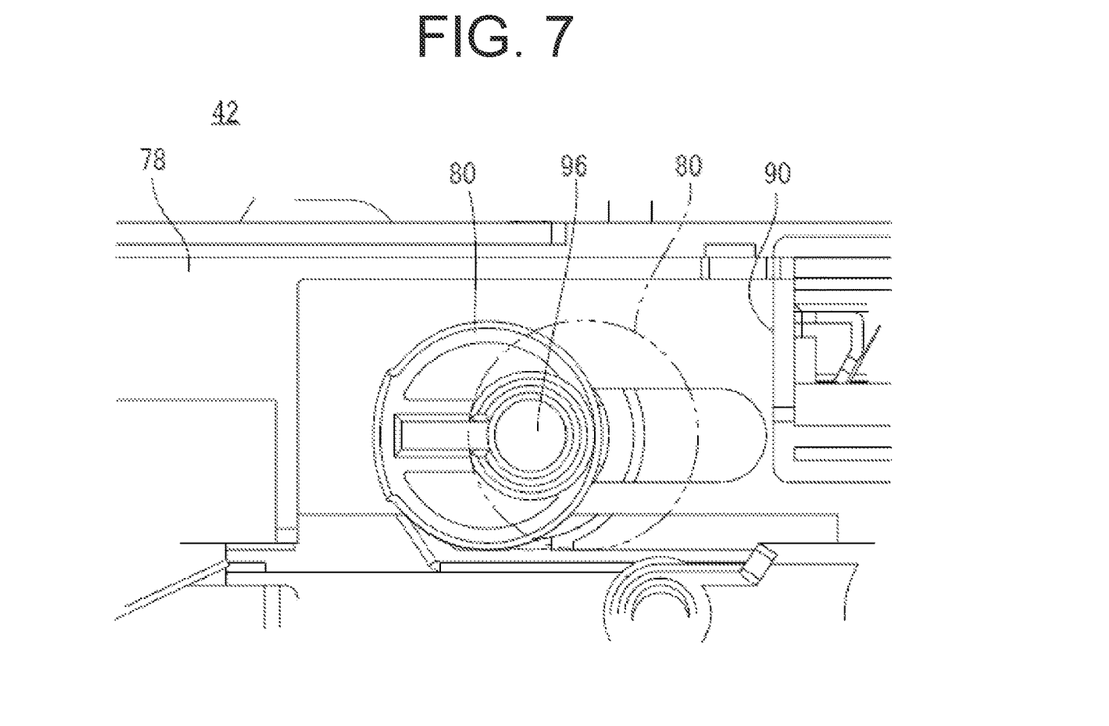
FIG. 7 is a diagram showing a peripheral part of a cam member of the primary transfer unit at the time of attachment or detachment.

Furthermore, in this embodiment, as shown in FIGS. 6 and 7, the configuration is made in such a manner that the link member 78 does not abut against the cam member 80 irrespective of the phase (rotation angle) of the cam member 80 when the link member 78 exists at the release position. Due to this, even if the cam member 80 is accidentally rotated when the link member 78 exists at the release position, damage to the link member 78 and the cam member 80 attributed to application of a load thereto can be prevented.

Figure 8:
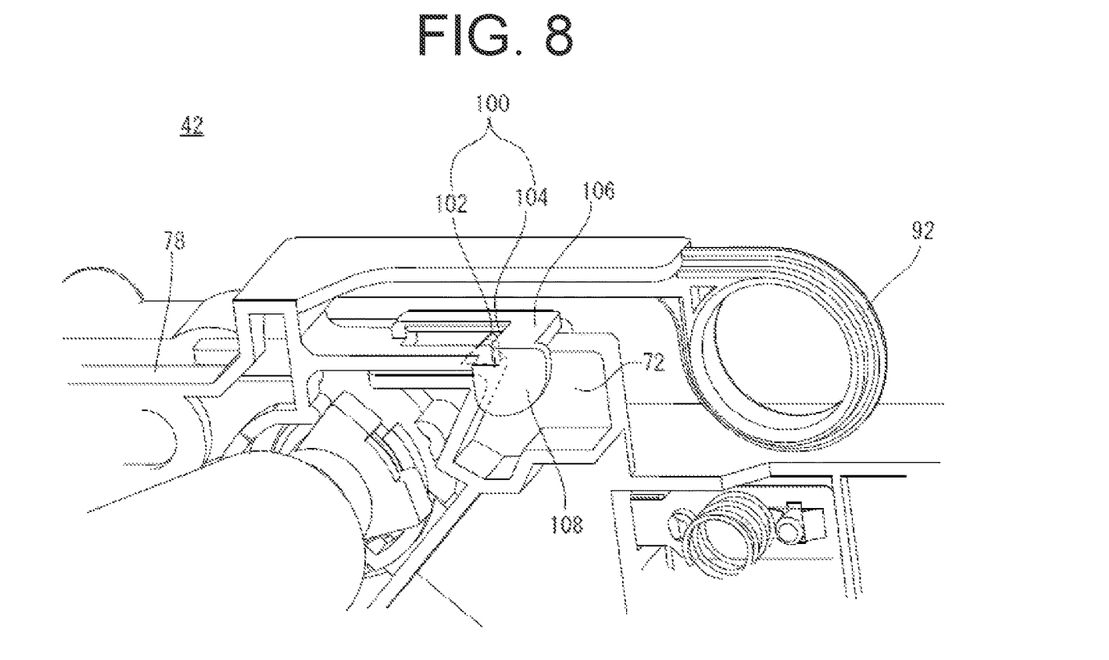
FIG. 8 is a front view showing a peripheral part of a lock mechanism of the primary transfer unit at the time of attachment or detachment.

Moreover, in this embodiment, as is well understood from FIG. 8, the primary transfer unit 42 includes a lock mechanism 100 that restricts the link member 78 from moving toward the left due to the urging force of the second urging member 94 when the link member 78 exists at the release position. That is, the lock mechanism 100 restricts the link member 78 from returning from the release position to the color position or the monochrome position.

Specifically, the lock mechanism 100 includes a first engaging part 102 disposed at a right end part of the unit frame 70 or 72 and a second engaging part 104 disposed at a right end part of the link member 78.

The first engaging part 102 is a triangular locking protrusion and protrudes upward from the upper surface of the unit frame 70 or 72. The first engaging part 102 (locking protrusion) has an inclined surface that is a slope rising toward the right as the left side surface and has a stopper surface extending in a substantially vertical direction as the right side surface. Meanwhile, a protruding piece 106 that is elastically deformable in the vertical direction is formed at the right end part of the link member 78. The second engaging part 104 is a rectangular locking hole and is formed in this protruding piece 106.

When the link member 78 exists at the release position, an inner edge part of the second engaging part 104 is locked to the stopper surface of the first engaging part 102 and thereby the link member 78 is restricted from moving toward the left. Furthermore, the restriction by the lock mechanism 100 (engagement between the first engaging part 102 and the second engaging part 104) can be released by slightly lifting up the protruding piece 106. In this embodiment, a fan-shaped release part 108 that protrudes from a tip part of the protruding piece 106 toward the lower right side obliquely is formed. When the right door is closed after the primary transfer unit 42 in the state in which the link member 78 exists at the release position is mounted in the apparatus main body 12, part of the inside surface of the right door (for example, part of the frame of the secondary transfer unit 44 attached to the right door) abuts against the release part 108 to lift up the protruding piece 106. This releases the restriction by the lock mechanism 100, so that the link member 78 automatically moves from the release position to the monochrome position or the color position. However, the release part 108 does not necessarily need to be disposed. The user may manually release the restriction by the lock mechanism 100 by lifting up the protruding piece 106.

Furthermore, although illustration is omitted, the image forming apparatus 10 includes a unit lock mechanism that restricts detachment of the primary transfer unit 42 from the apparatus main body 12. For example, the unit lock mechanism includes a lock pin disposed in the primary transfer unit 42 in such a manner as to be capable of reciprocating in the front-rear direction. This lock pin operates in conjunction with the link member 78. In the state in which the link member 78 exists at the color position or the monochrome position, the lock pin restricts detachment of the primary transfer unit 42 from the apparatus main body 12 by being locked in a locking hole formed in the main body frame of the apparatus main body 12. This restriction is released in association with the movement of the link member 78 from the color position or the monochrome position to the release position.

As described above, according to this embodiment, the user manually moves the link members 78 to the release position by using the first grips 92. This causes all of the primary transfer rollers 60 (and hence the primary transfer belt 54) to separate from the photoreceptor drums 36. Therefore, with suppression of the cost, by simple configuration and operation, the primary transfer belt 54 can be kept separate from the photoreceptor drums 36 when the primary transfer unit 42 is detached from the apparatus main body 12.

Furthermore, because all of the primary transfer rollers 60 separate from the photoreceptor drums 36 in conjunction with the manual operation of detaching the primary transfer unit 42 from the apparatus main body 12, special operation for separating the primary transfer rollers 60 is not necessary, which is excellent in the convenience.

In the above-described embodiment, a multifunction peripheral obtained by combining a copier, a facsimile machine, a printer, etc., has been exemplified as the image forming apparatus 10. Alternatively, the image forming apparatus 10 may be any of a copier, a facsimile machine, a printer, etc., or a multifunction peripheral obtained by combining at least two of them.

Furthermore, specific shapes of parts, dimensions, and the like, described above are all merely an example and can be appropriately changed as necessary according to a product specification and the like.

What is claimed is:
1. An image forming apparatus comprising a plurality of photoreceptors, and a primary transfer unit that is attachable to a main body of the image forming apparatus,
the primary transfer unit including:
a primary transfer belt onto which toner images are transferred from the plurality of photoreceptors;
a plurality of primary transfer rollers that includes a first primary transfer roller for black and a plurality of second primary transfer rollers for color, each of the plurality of primary transfer rollers disposed opposite a respective one of the plurality of photoreceptors with the primary transfer belt therebetween; and
a contact and separation mechanism that causes the plurality of primary transfer rollers to come into contact with and separate from the plurality of photoreceptors, wherein the contact and separation mechanism includes:
- a plurality of arm members, each rotatably supporting a respective one of the plurality of primary transfer rollers;
- a link member that is disposed to be capable of reciprocating in a reciprocating direction orthogonal to an axial direction of the plurality of primary transfer rollers and causes the plurality of primary transfer rollers to come into contact with and separate from the plurality of photoreceptors by displacing the plurality of arm members according to a movement position;
- a cam member that presses and reciprocates the link member; and
- a grip disposed at one end part of the link member, wherein:
the cam member rotates by receiving a driving force from a drive source to cause the link member to reciprocate to a color position with which all of the plurality of primary transfer rollers abut against the plurality of photoreceptors with the primary transfer belt therebetween, and to a monochrome position with which the first primary transfer roller for black abuts against the respective one of the plurality of photoreceptors with the primary transfer belt therebetween, each of the plurality of second primary transfer rollers for color is separated from the respective one of the plurality of photoreceptors by a first distance, a user moves the link member from the color position or the monochrome position to a release position by using the grip to separate the plurality of primary transfer rollers from the plurality of photoreceptors, when the primary transfer unit is detached from the main body of the image forming apparatus, the link member moves from the color position or the monochrome position to the release position by pulling the grip toward a take-out port side of the main body, and the primary transfer unit is taken out from the main body by further pulling the grip after the link member has moved to the release position, and the reciprocating direction of the link member and an attachment-detachment direction of the primary transfer unit are parallel to each other.

2. The image forming apparatus according to claim 1, wherein the user moves the link member from the color position or the monochrome position to the release position by using the grip to separate each of the plurality of second primary transfer rollers for color from the respective one of the plurality of photoreceptors by a second distance longer than the first distance.

3. The image forming apparatus according to claim 1, wherein the primary transfer unit includes a lock mechanism that restricts the link member from returning from the release position to the color position or the monochrome position.

4. The image forming apparatus according to claim 1, wherein the link member does not abut against the cam member in a state in which the link member exists at the release position.

* * * * *